United States Patent [19]
Lamson

[11] Patent Number: 6,135,754
[45] Date of Patent: Oct. 24, 2000

[54] ADJUSTABLE FEED ROLLER MECHANISM FOR LIP ROLLING MACHINE

[75] Inventor: Wayne W. Lamson, Beaverton, Mich.

[73] Assignee: Brown Machine, L.L.C., Beaverton, Mich.

[21] Appl. No.: 09/203,897

[22] Filed: Dec. 2, 1998

[51] Int. Cl.[7] .................................................. B29C 53/34
[52] U.S. Cl. .......................................... 425/392; 425/402
[58] Field of Search .................................... 425/383, 392, 425/402

[56] References Cited

U.S. PATENT DOCUMENTS

| 3,192,565 | 7/1965 | Rukavina | 425/392 |
| 3,914,102 | 10/1975 | Brown | 425/392 |
| 3,920,373 | 11/1975 | Brown | 425/392 |

*Primary Examiner*—Tim Heitbrink
*Attorney, Agent, or Firm*—John R. Benefiel

[57] ABSTRACT

A feed roller mechanism for a lip rolling machine for thermoformed containers, in which simultaneous adjustment of both the roller feed angle and the trim diameter are each carried out using separate systems of slides and linkages.

12 Claims, 10 Drawing Sheets

ADJUSTABLE FEED ROLLER MECHANISM FOR LIP ROLLING MACHINE

BACKGROUND OF THE INVENTION

This invention concerns machines for the manufacture of thermoformed plastic containers, such as cups, and more particularly machines for forming a bead on the lip of the molded cup, generally referred to as lip curling or rolling machines. Such apparatus has been known for many years in the industry, and is described in U.S. Pat. No. 3,337,919 issued on Aug. 29, 1967 for a "Container Rim Beading Apparatus". This type of machine includes a set of feed rollers receiving a continuous train of nested cups extending horizontally, which are advanced at a carefully set rate through a heating oven to soften the cup rims and thence into a lip curling screw mechanism which forms the heated rims into a smooth lip. The feed rollers also rotate the cup stack at a rate matched to the rotation of the curling screws for proper feed into the curling screws.

This arrangement has performed well over the years and has been widely used in the industry.

Many of these machines are designed to be adjustable for different container configurations. The adjustable size require significant maintenance support, particularly in being initially set up for a run of each size and type of container. The feed rollers, typically three in number, are each mounted for an individual pivotal adjustment about an axis extending normally to the center axis of a circle about which the feed rollers are arranged. The degree of tilt of the rollers with respect to the path of the nested cups controls the rate of feed. It is critical that the feed rate be set in close correspondence to the rate of advance through the curling screws in order that the cups stay fully nested while in the oven for proper heating of the rim only. That is, if the feed rate is too slow, the cups become separated and the cup bodies become exposed to be heated and softened. The feed of the cups also must not be too high as this will unduly compress the stack and cause twisting and snaking of the stack in the oven. The proper feed rate is mostly a function of the stack height of a given cup configuration, as the rate of feed of the stack of cups into the curling screws necessarily varies with the number of cups per unit length in the stack.

A slow, painstaking adjustment of each individual feed roller has in the past been necessary, carried out while the machine is shut down, adversely affecting productivity. This process would typically take several hours for an initial set up.

It is also difficult to repeat a given set up such that to some degree a trial and error process is involved.

It is desirable that different sizes of cups will be run on the same machine, such that the radial spacing of the feed rollers, must also be set individually with the machine shuts down, making it impossible for the center axis around which the feed rollers are arranged to be located exactly on the center axis of the guide bars extending through the oven. This discrepancy substantially limits the production rate of the machine, particularly when other inaccuracies are present.

Adjustments in the feed diameter also affects the feed rate, requiring both to be painstakingly adjusted alternately.

Previous attempts to provide an improved method adjustment of the feed rollers have not been successful.

Accordingly, it is the object of the present invention to provide mechanisms for simultaneously adjusting each of the feed roller angle and the feed roller diameter in a lip forming machine of the type described, which allows for much quicker adjustments and that both said adjustments can be made while the machine is in operation.

Another object is to provide an adjustable feed roller mechanism which maintains an accurate alignment of the center axis of the rollers with the other components of the machine to allow high production rates.

It is a further object to provide such mechanisms which allow a given set up to be reliably and quickly reset at a later time to minimize changeover to different container types and/or sizes.

SUMMARY OF THE INVENTION

These and other objects which will become apparent upon a reading of the following specification and claims are achieved by mechanically interconnecting the feed rollers so as to constrain simultaneous adjusting movement of the feed rollers both for feed rate and trim diameter adjustments. This interconnection comprises a linkage slide system for each adjustment made.

For the angle or feed rate adjustment, each feed roller assembly is mounted on a pivot axis extending radially from the center of rotation of the feed roller, with an elongated member projecting transversely to the pivot axis and at a shallow angle to the line of movement of an angle adjust slide. The inclined elongated member and angle adjust slide are coupled by a guide block member affixed to the angle adjust slide, the guide block member having a slot receiving a self aligning bearing cylinder which is able to rotate in the guide block slot, and which has an opening slidably receiving the inclined elongated member.

Each of the adjustment slides are driven simultaneously by a linkage system, which is in turn operated by a threaded rod adjuster.

As each slide is shifted in or out, the associated inclined member is turned in either direction to adjust the tilt angle of the respective roller axis, and thereby adjust the feed rate.

Each feed roller assembly is mounted on one of a plurality of diameter adjusting slides arranged to be moved simultaneously radially in and out to be set to different diameter cups.

The diameter adjusting slides are driven simultaneously by a linkage system operated by a second threaded rod adjuster. The bearing cylinder is slotted to accommodate the inclined member movement when adjustments in diameter are carried out. When either of these adjustments are made, the centerline of the roller array is not shifted, to maintain its alignment with the rest of the machine.

The threaded rod adjusters both include detents to make incremental adjustments easier and also have opposing faces which are spaced correspondingly to each which allows caliper measurements to be taken for establishing a record of any given adjustment, and allowing convenient resetting at a later time.

An automatic belt tensioner for a belt drive system accommodates changes in position of drive pulleys associated with each roller as angle and diameter adjustments are carried out.

DETAILED DESCRIPTION

In the following detailed description, certain specific terminology will be employed for the sake of clarity and a particular embodiment described in accordance with the requirements of 35 USC 112, but it is to be understood that the same is not intended to be limiting and should not be so construed inasmuch as the invention is capable of taking many forms and variations within the scope of the appended claims.

Figure 1:
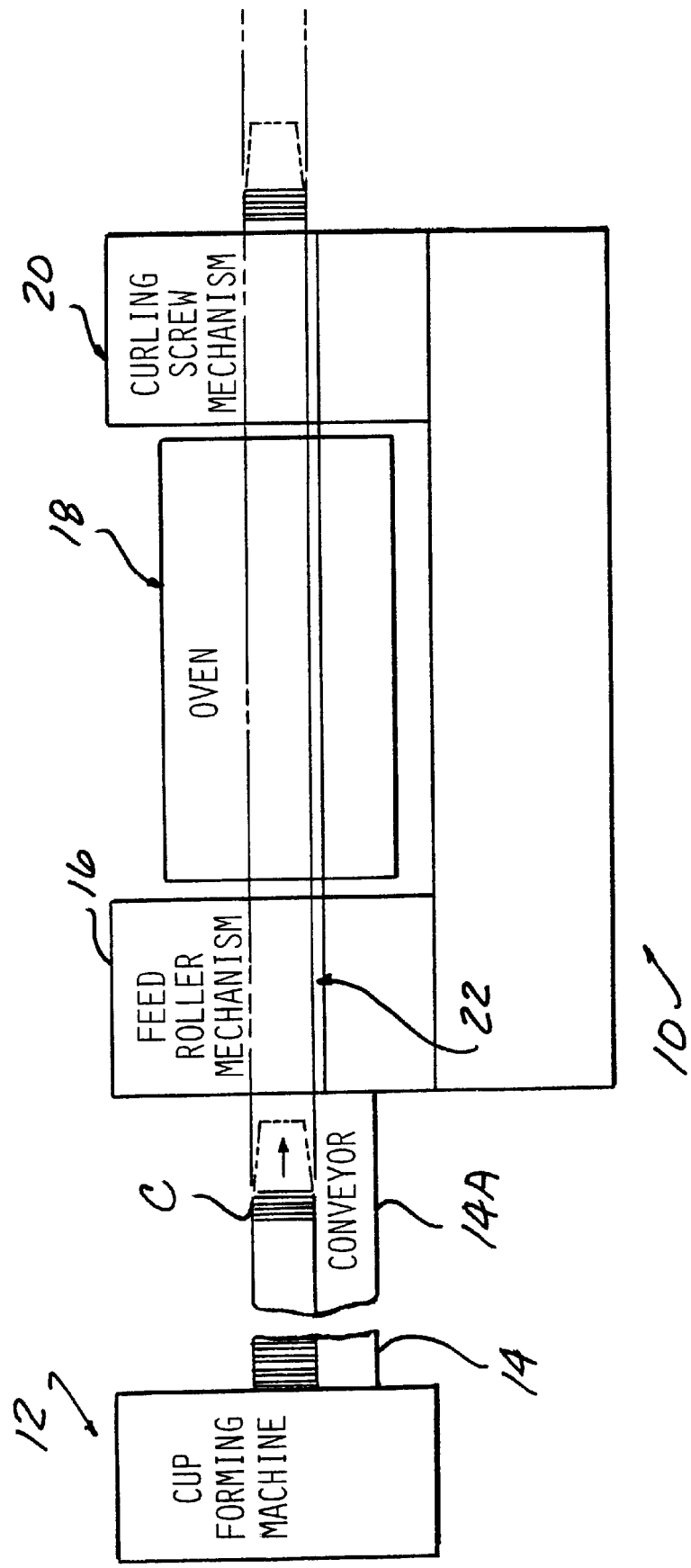
FIG. 1 is a diagrammatic representation of a lip rolling machine incorporating the feed rate and diameter adjustment mechanisms according to the present invention.

Referring to the drawings, and particularly FIG. 1, a lip rolling machine 10 of the type shown in U.S. Pat. No. 3,337,919 is represented diagrammatically.

A train of nested cups C (lying on their sides) is conveyed continuously from a cup forming machine 12. Typically, accumulating devices (not shown) may be used to insure a constant supply of nested cups to the lip curling machine 10 via a conveyor 14.

A transition conveyor 14A receives the train of nested cups and feeds it accurately into the center axis of a space around which a set of feed rollers are arranged.

The lip forming machine 10 includes a feed roller mechanism 16 comprising a set of rollers each mounted for powered rotation, and arranged about the center axis of a circular space defined by the feed roller outer perimeters, to engage the rims of the cups C and to rotate the same. The rollers 16 are adjustably tilted out of the plane of the circle to also feed the cup stack at a predetermined feed rate through an oven 18. The exposed cup rims are heated in the oven to be softened in preparation to be curled by curling screws 20. The cup train is supported on guide rods 22 while in the lip forming machine 10 to be accurately guided to the curling screw mechanism 20. These rods may also be adjustable to each container size.

The feed in the mechanism rollers 16 are rotated by a belt drive (described below) to cause the cup train to be rotating as it enters the space between the curling screws 20.

The feed rate induced by the mechanism 16 is adjustable to be closely matched to the speed of operation of the curling screw mechanism 20, as described above. In addition, the diameter of the circle around which the feed rollers are arranged must be adjustable if the machine is to be used for variously sized cups.

The present invention has to do with an improved adjustable feed roller mechanism 16 in which all of the rollers are simultaneously adjustable either as to the pivot angle to set the feed rate, or as to trim diameter to be matched to different container sizes. These adjustments may be made when the machine is running, in order to more easily determine if a proper adjustment has been accomplished, and to eliminate the need to interrupt production.

Figure 2:
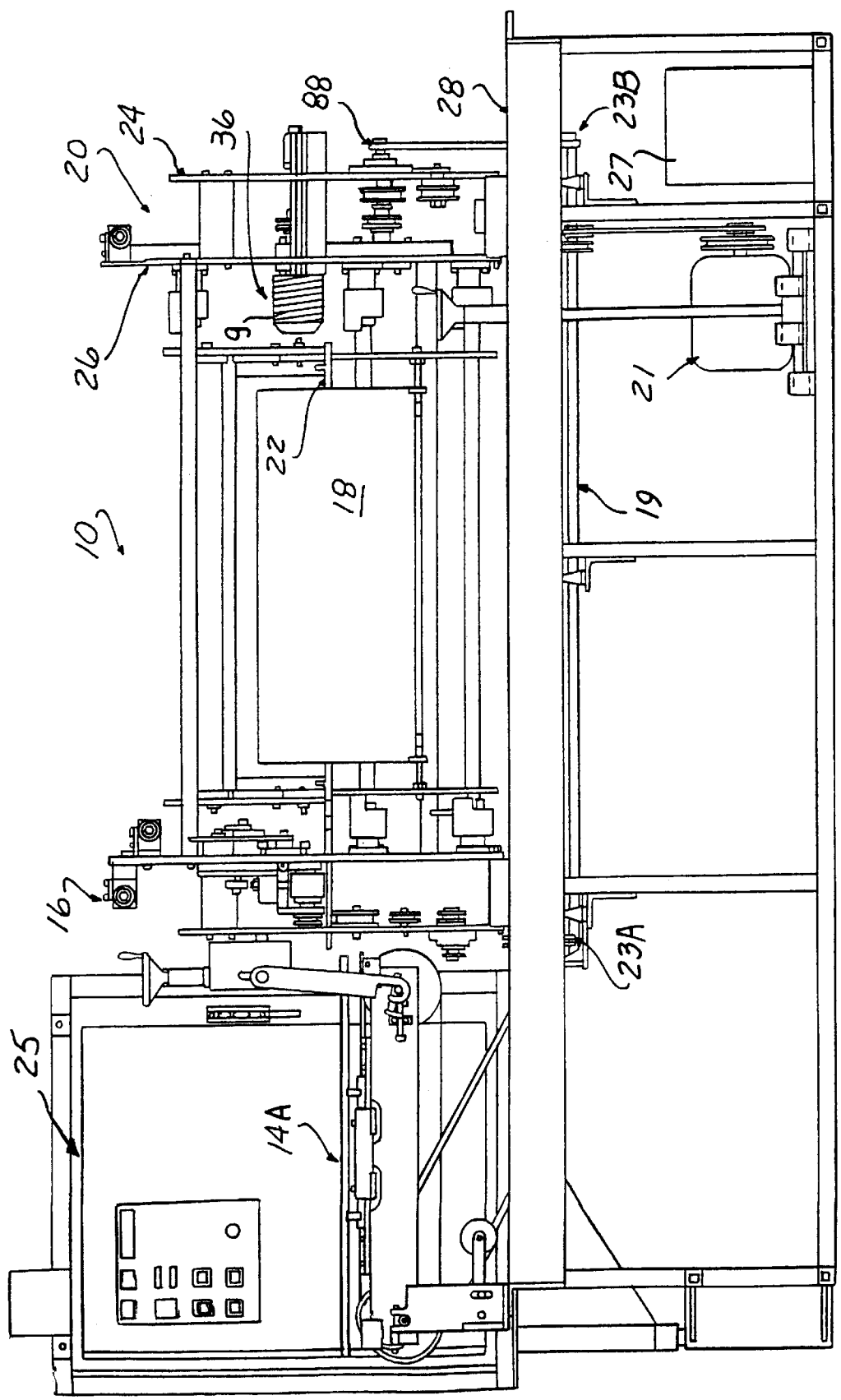
FIG. 2 is a front elevational view of a machine of the type depicted in FIG. 1.

FIG. 2 shows a lip curling machine incorporating the feed roller mechanism 16 according to the present invention, mounted to an end plate 24 and a main plate 26, which are joined together and detachably bolted to a machine base 28. Oven 18 and a lip curling screw mechanism 20 are separately mounted to the base. These latter components are not required for use of the present invention, as the improved feed roller mechanism 16 may be used with various oven and curling screw mechanism designs. However, an improved form of each of these components is described in copending applications U.S. Ser. No. 09/203,896, filed on Dec. 2, 1998. and U.S. Ser. No. 09/203,912, filed on Dec. 2, 1998, An improved transition conveyor 14A and guide adjustment are also described in U.S. Ser. No. 09/203,912, filed on Dec. 2, 1998.

A single electric motor 21 drives both the feed roller mechanism 16 and the curling screw mechanism 20 via a cross shaft 19 extending along the base 28 and pulleys 23A, 23B at either end in order to insure synchronized rotational speed in each mechanism.

Figure 3:
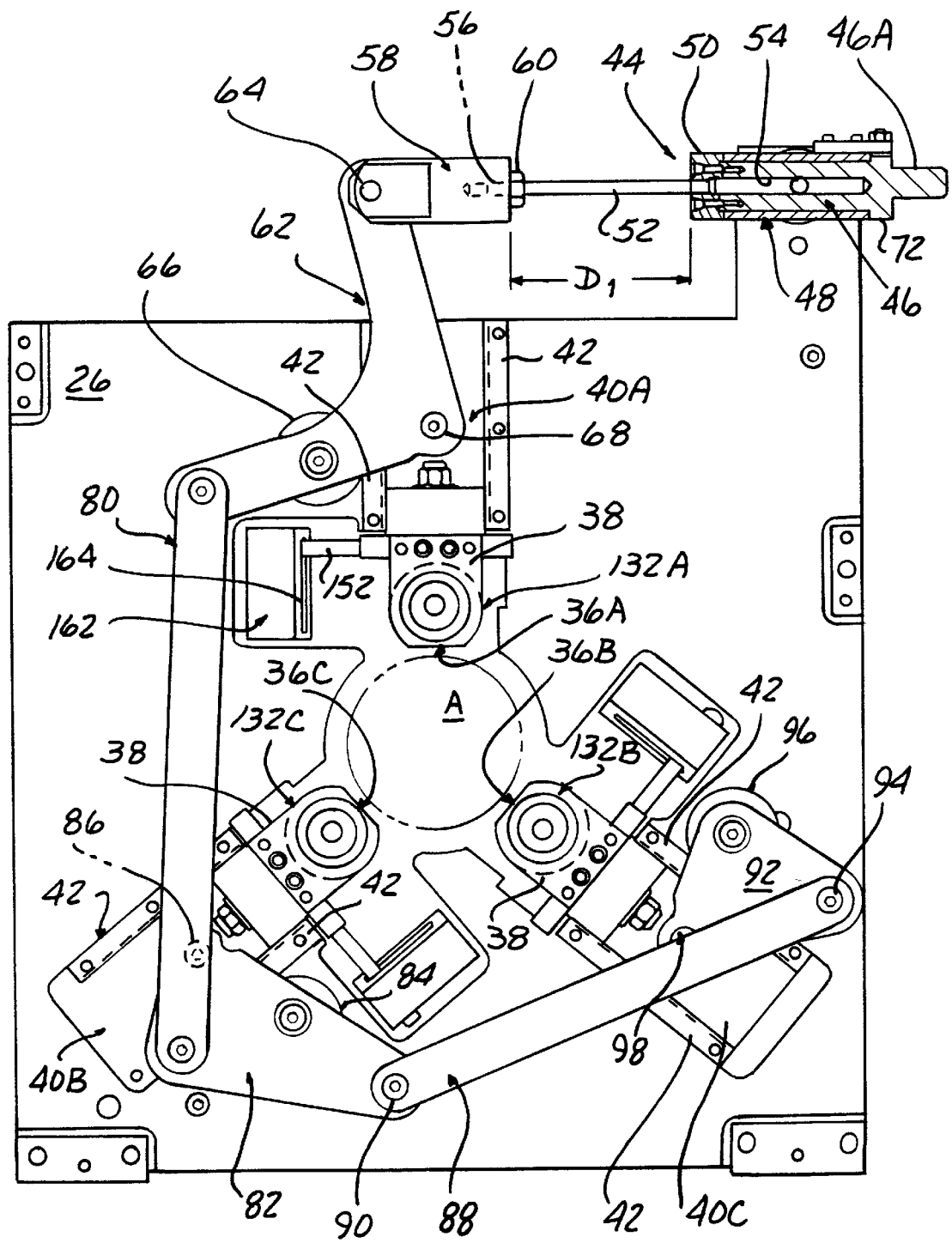
FIG. 3 is a side elevational view of a portion of the machine shown in FIG. 2 showing certain components of the feed roller diameter adjustment mechanism according to the present invention.

FIG. 3 shows some of the components of the feed roller mechanism 16, mounted on the oven side of the main mounting plate 26. This includes the three feed rollers 36A, 36B, 36C, arranged in a circle A having a diameter which in variable to accommodate differing cup sizes. The roller mounting brackets 38 are each positioned by a linkage-slide system. Each are mounted to a respective diameter adjust slide 40A, 40B, 40C slidable in spaced parallel guide rails 42. Simultaneous positioning of the diameter adjust slides 40A, 40B, 40C is controlled by a linkage system driven by a threaded rod adjuster 44.

A sleeve 46 has a square crank handle engagable end formed thereon to enable manual rotation of the sleeve 46 in a housing 48. A threaded end cap 50 engages one end of a threaded rod 52 which may be received in an oversized bore 54 of sleeve 46. The other end 56 of threaded rod 52 is threaded into a threaded bore in an end piece 58, with a nut 60 insuring a locked condition.

Figure 15:
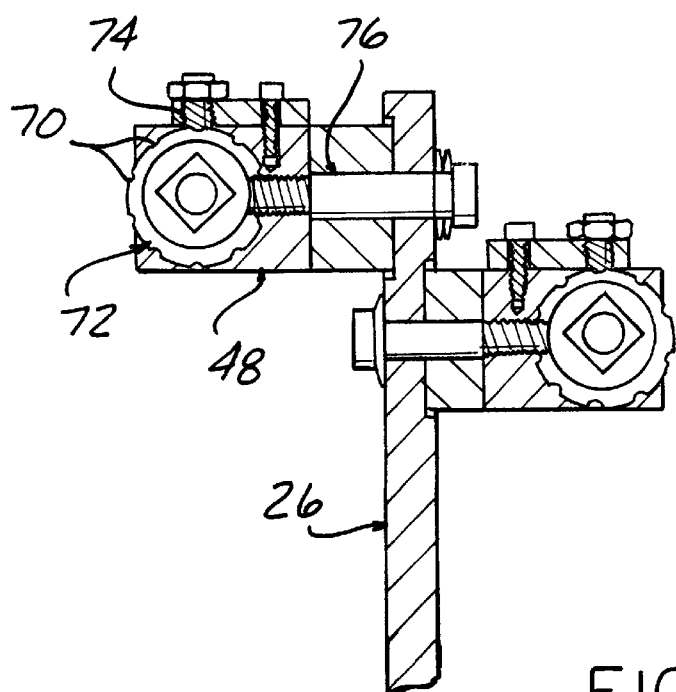
FIG. 15 is a partially sectional front view of the adjusters used to set the feed roller angle and the feed roller trim diameter.

A detent is provided by a series of grooves 70 in sleeve flange 72 (FIG. 15), grooves 70 engaged by a spring loaded detent ball mounted in the end of set screw 74. The housing 48 is mounted to the main plate 26 by a shoulder bolt 76, allowing tilting as adjustments are carried out.

The end piece 58 is pivotally connected to a first lever arm 62 by a shoulder bolt 64. The first lever arm 62 is pivotally mounted on the main plate 26 by a pivot 66. The upper slide 40A is pivotally connected to the upper portion of the lever arm 62 by a shoulder bolt 68 so that as the lever arm 62 is pivoted by advance or retraction of the threaded rod 52, the slide 40A moves radially in and out.

The lower portion of the lever arm 62 is pivotally connected to a connecting link 80, extending to a second lever arm 82 pivotally supported on the main plate 26 by a bronze bushing 84. The second lever arm 82 is pivotally attached to a second slide 40B with shoulder bolt 86.

The second lever arm 82 has the opposite end pivotally connected to a second link 88 by a shoulder bolt 90, which in turn is pivotally connected to a third lever arm 92 by a shoulder bolt 94. The third lever arm 92 is pivoted to the main plate 26 on a bronze bushing 96 and also to the third slide 40 C by a shoulder bolt 98.

Thus, all of the slides 40A, 40B, 40C move in and out in unison as the sleeve 46 is rotated in either direction.

A given adjustment can be recorded and reset by measuring, as with calipers, the distance $D_1$ between opposing end faces of the end piece 58 and threaded bore end cap 50.

Figure 4:
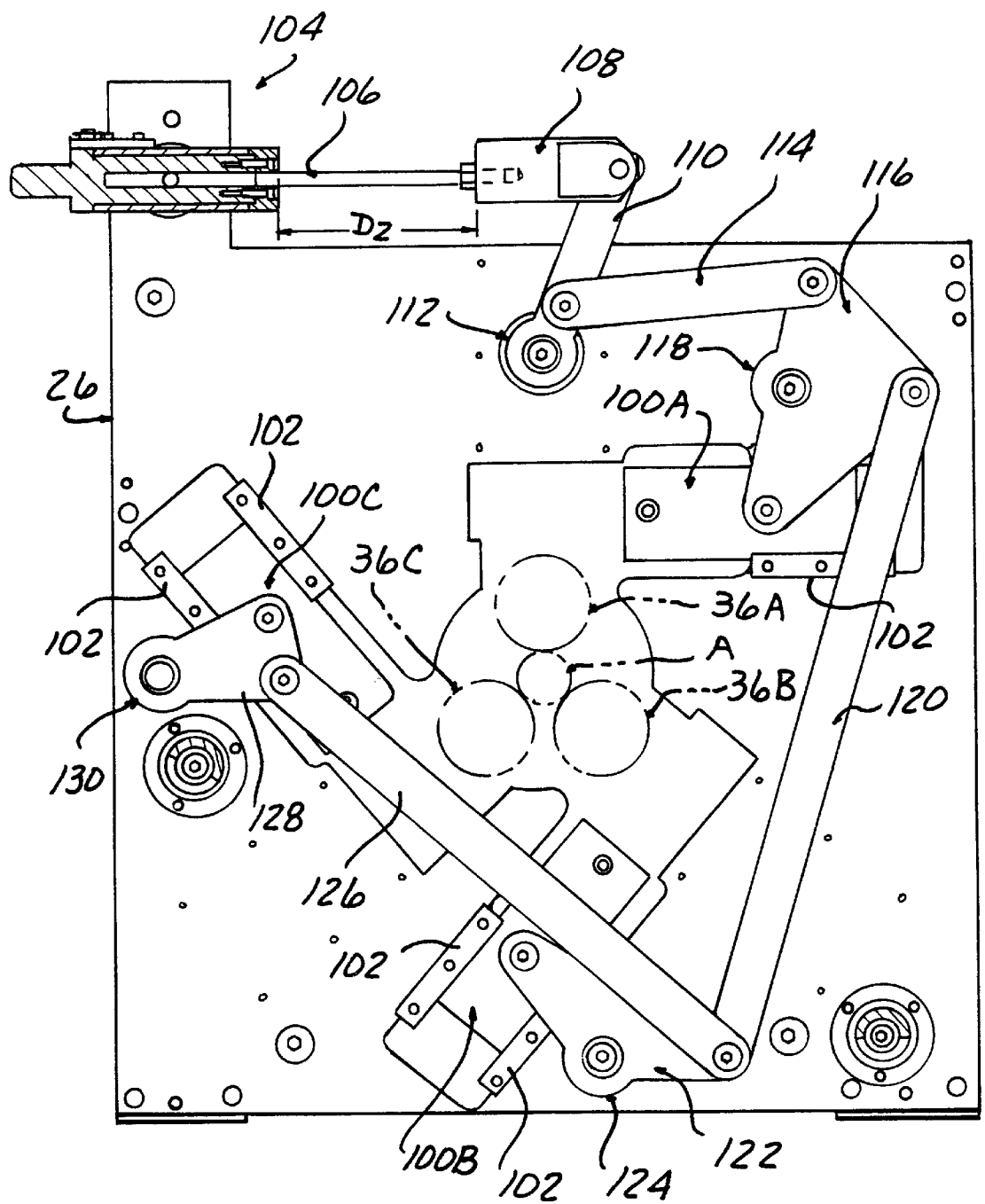
FIG. 4 is a side elevational view of a portion of the machine shown in FIG. 2 showing certain components of the feed roller angle adjustment mechanism according to the invention.
Figure 5:
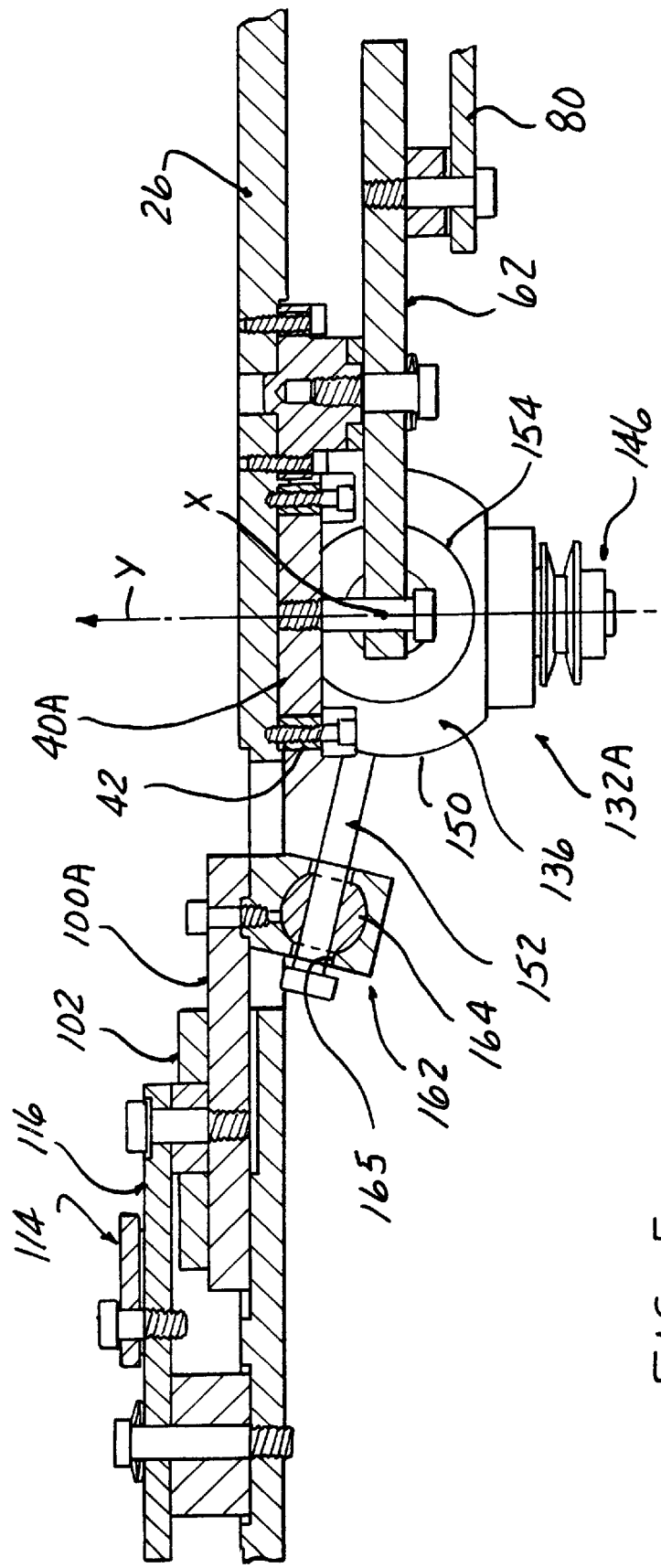
FIG. 5 is a partially sectional plan view of the main plate in fragmentary form, and certain components of the feed roller angle and diameter adjust mechanisms.
Figure 7:
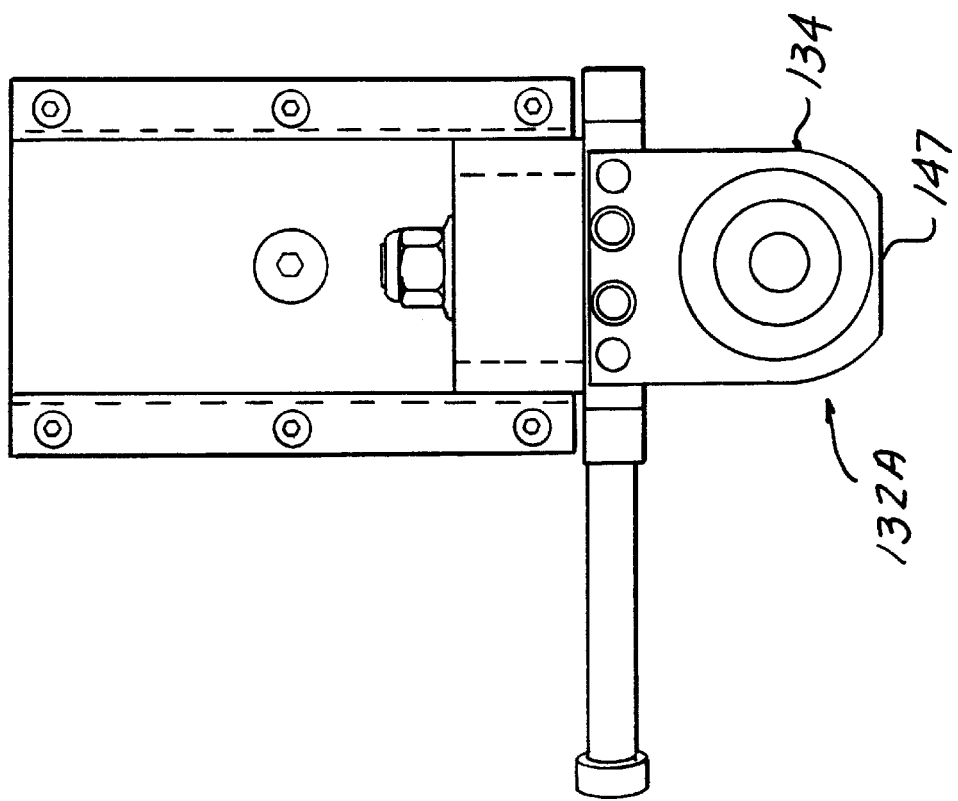
FIG. 7 is an enlarged side view of the assembly shown in FIG. 6.
Figure 6:
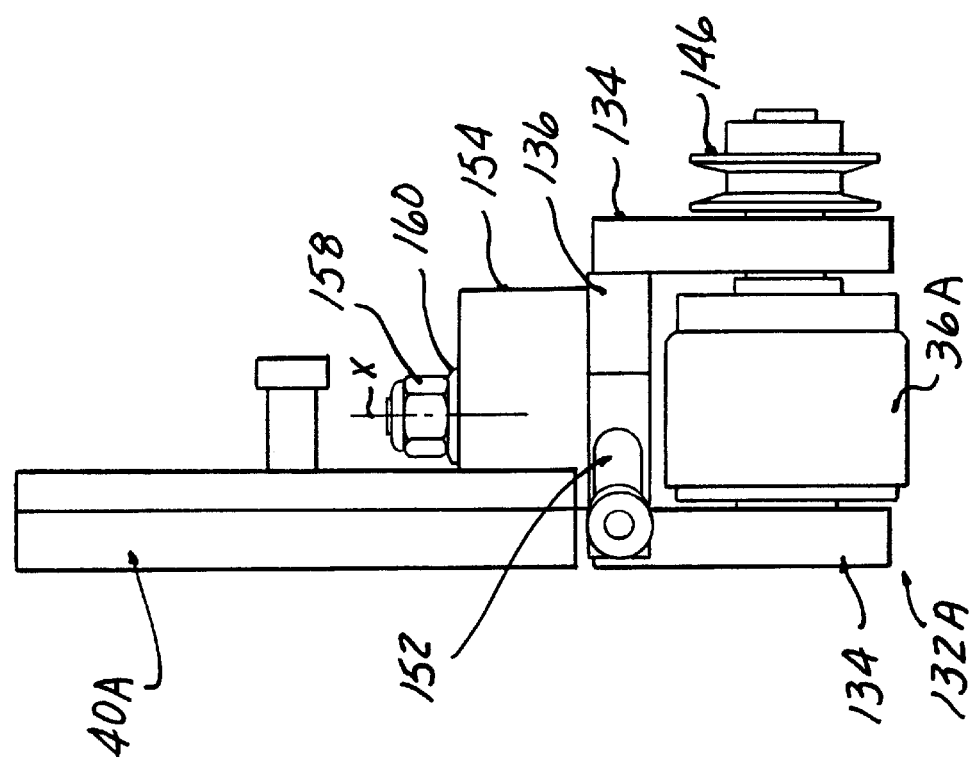
FIG. 6 is an enlarged front view of a feed roller assembly and diameter adjust components shown in FIG. 5.
Figure 8:
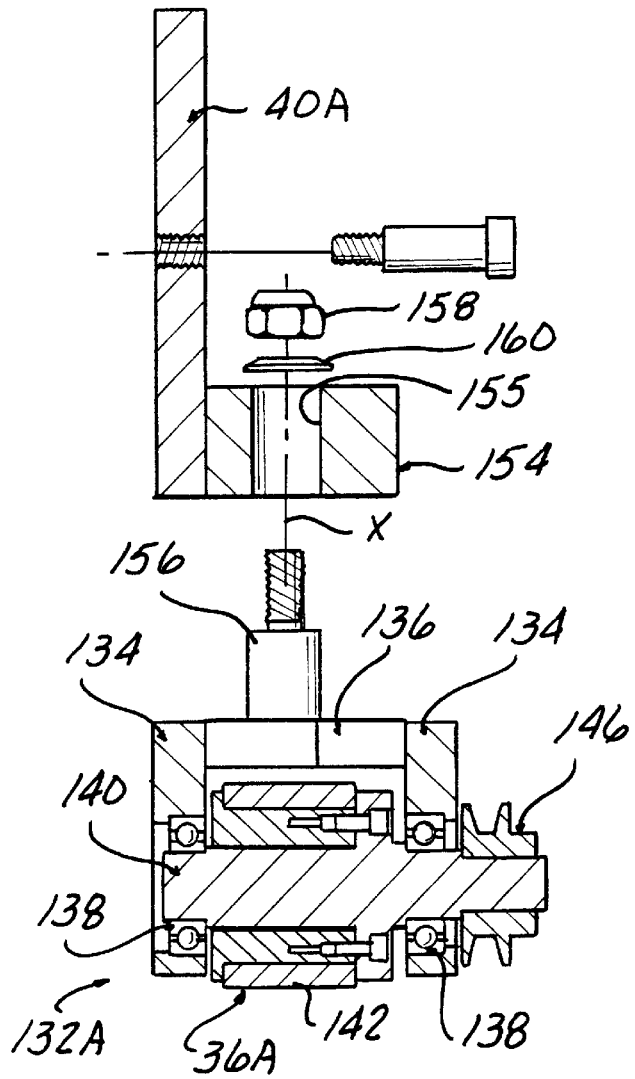
FIG. 8 is a partially sectional and exploded view of a feed roller and trim diameter adjust slide assembly.
Figure 9:
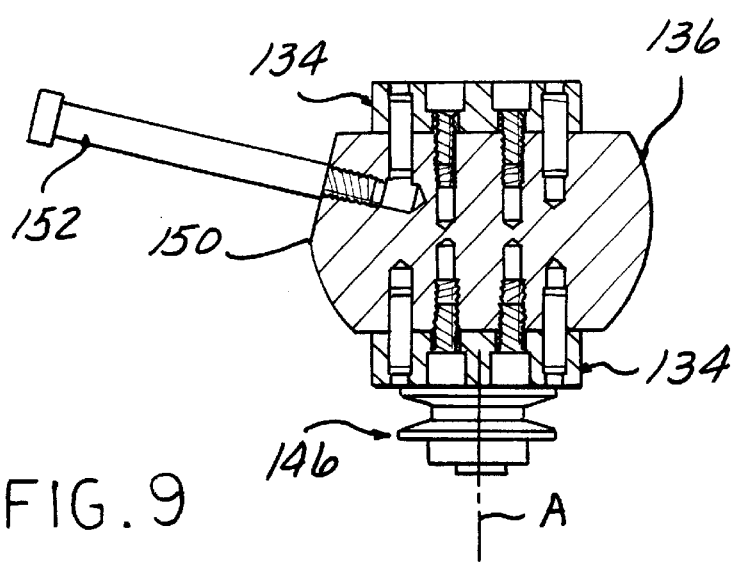
FIG. 9 is a partially sectional plan view of a roller assembly.

As can be seen in FIG. 4, the opposite side of the main plate 26 mounts an angle adjust linkage-slide system, including angle adjust slides 100A, 100B, 100C slidable in spaced apart parallel guide rails 102 to move in a direction substantially transversely to a radius line emanating from the center of rotation of the particular feed roller.

A threaded rod adjuster 104 similar to the diameter adjuster 44 is provided, in which a threaded rod 106 has an end piece 108 pivoted to an operating arm 110 pivotally supported on the main plate 26 by a bronze bushing 112 and to a first link 114. First link 114 is pivoted to one end of a first lever arm 116 pivoted to the main plate 26 on a bronze bushing 118. The other side of first lever arm 116 is pivoted to first angle adjust slide 100A. A second link 120 is also pivoted to the first lever arm 116 at one end, the other end pivoted to a second lever arm 122 rotatable on the main plate 26 by means of a bronze bushing 124.

The second lever arm 122 is pivoted to the second angle adjust slide 100B and also to a third link 126 pivoted to a third lever arm 128. Third lever arm 128 is pivoted on the main plate 26 by a bronze bushing 130 and also to the third slide 100C.

Thus, all three angle adjust slides 100A, B, C are moved in unison with adjustments of the threaded rod 106 in either direction.

A given adjustment can be recorded and reset by measuring the dimension $D_1$ as with calipers, corresponding to each adjusted position.

FIGS. 5–9 show further details of the angle adjust components of the feed roller mechanism, with the associated components of the uppermost roller 36A being shown for illustrative purposes.

The roller assembly 132A includes a yoke formed by a pair of end plates 134 attached to a pivot plate 136, end plates 134 supporting bearings 138 rotatably supporting a roller axle shaft 140. A urethane roller cover 142 is mounted on a sleeve 144 attached to the axle shaft 140. A drive pulley 146 is fixed to the outboard end of the axle shaft 140. A flat 148 allows the roller to protrude past the end of the side plates 134 to be able to engage the cups C.

The pivot plate 136 has an angled flat 150 against which an elongated member comprised of shoulder bolt 152 is seated to extend at an angle of 12° from a right angle to the roller axis A.

The roller assembly 132A is pivoted on the diameter adjust slide 40A by a roller pivot cylinder 154 fixed to the slide 40A, having a bore 155 receiving a shaft 156, retained with a lock nut 158 and spring washer 160. The pivot axis X (FIG. 6) extends at right angles to the axis of cup movement Y (FIG. 5), i.e., axis X extends radially from the center of the roller circle A (FIG. 4). Thus, to the degree that the roller assembly 132A is pivoted about axis X, and tilted out of the plane of circle A, an increasing axial drive component is produced, to thereby increase the feed rate, in the manner well known to those skilled in the art.

The angle adjusting slide 100A has a holder block 162 affixed thereto inclined at an angle corresponding to the angle of the shoulder bolt 152. A self aligning guide bearing cylinder 165 is rotatable within a slot 164 in the block 162.

Figure 10A:
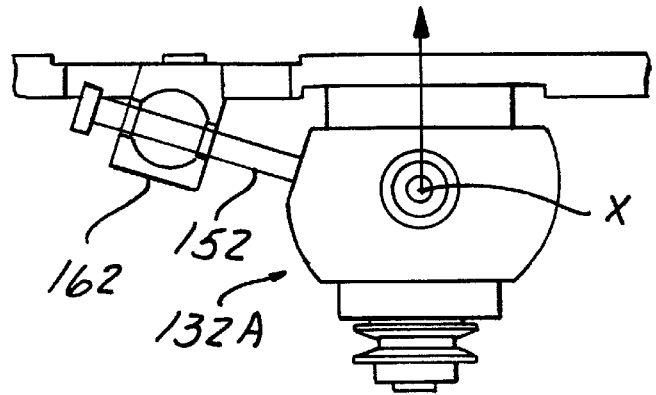
FIGS. 10A and 10B are partially sectional plan views of a roller assembly and angle adjust slide components in two respective adjusted positions.
Figure 10B:
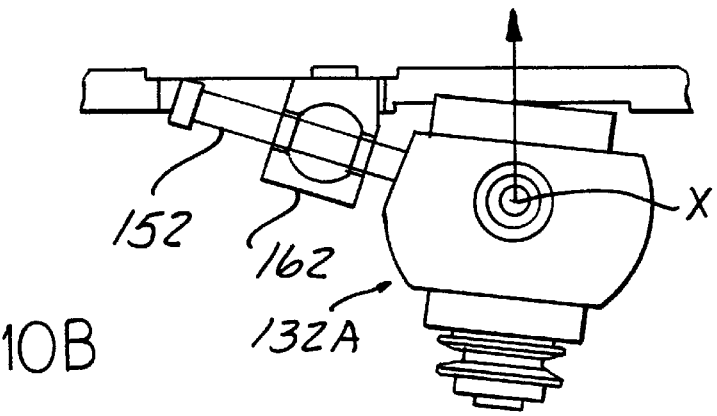

As the slide 100A moves in either direction, the inclination of the bolt 152 is changed, to pivot the roller assembly 132A (FIGS. 6, 10A, 10B) about axis X, causing an increase or decrease in the feed rate. This is shown in FIGS. 10A, 10B.

Because all of the roller assemblies 132A, B and C are moved in unison, this adjustment may be carried out much more quickly, and during machine operation in distinction to prior art arrangements. A range of 0° to 5° of the feed roller inclination has been found to provide a sufficient range of feed rates to accommodate the necessary feed rates for products currently in production.

Figure 11C:
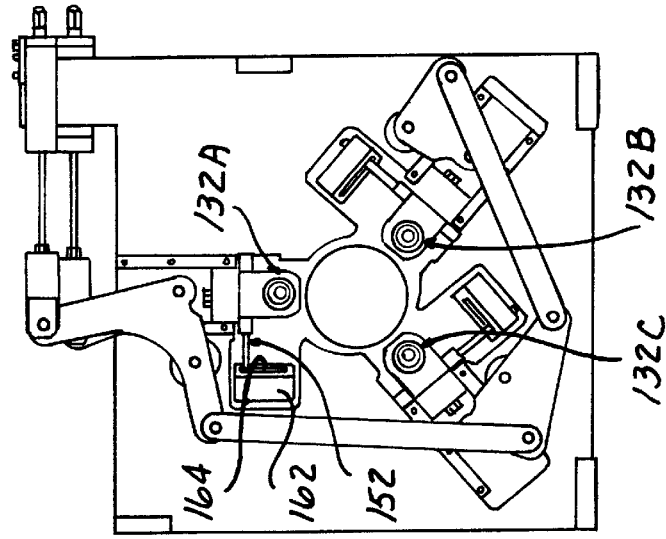
FIGS. 11A–11C are end views of the trim diameter adjusting mechanism and the angle adjust guide mechanism bearing in respective adjusted positions.
Figure 11B:
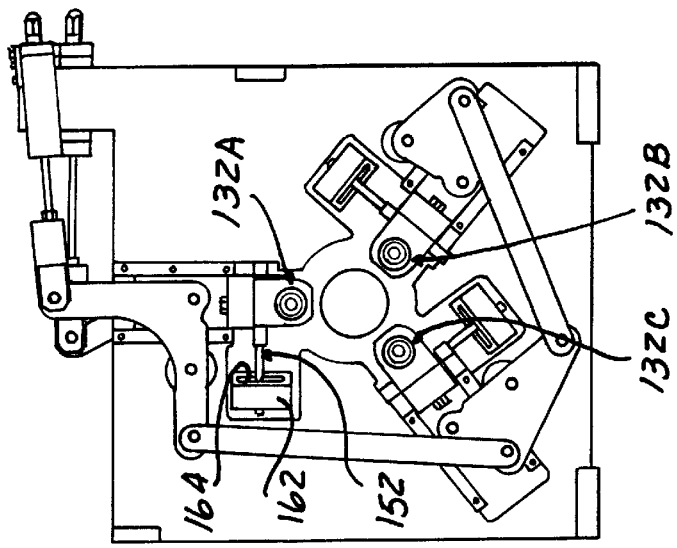
Figure 11A:
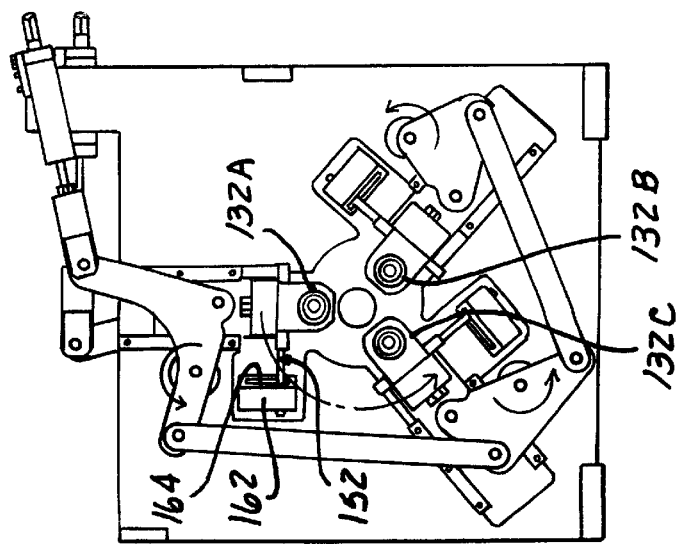

The slot 164 accommodates changes in diameter of the roller assemblies 132A, 132B, 132C (FIGS. 11A, 11B, 11C) such that such trim diameter adjustments have no effect on the feed rate adjustments, and vice versa. This greatly simplifies the adjustment process.

Figure 14:
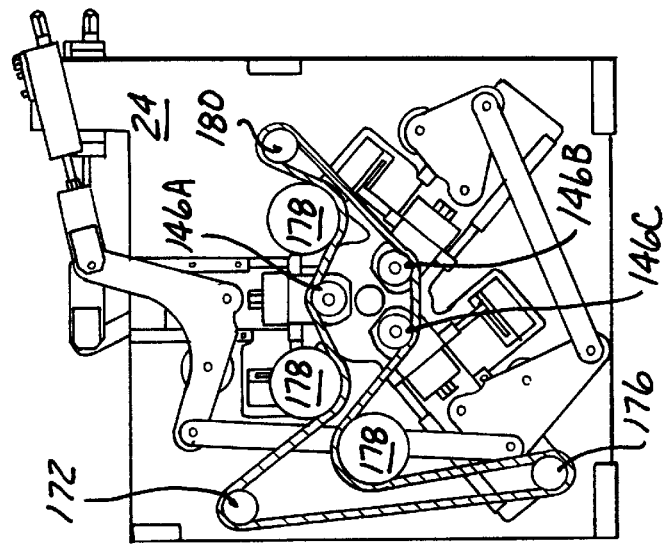
FIG. 14 is the same view as FIG. 13 but with the minimum trim diameter adjusted condition.
Figure 13:
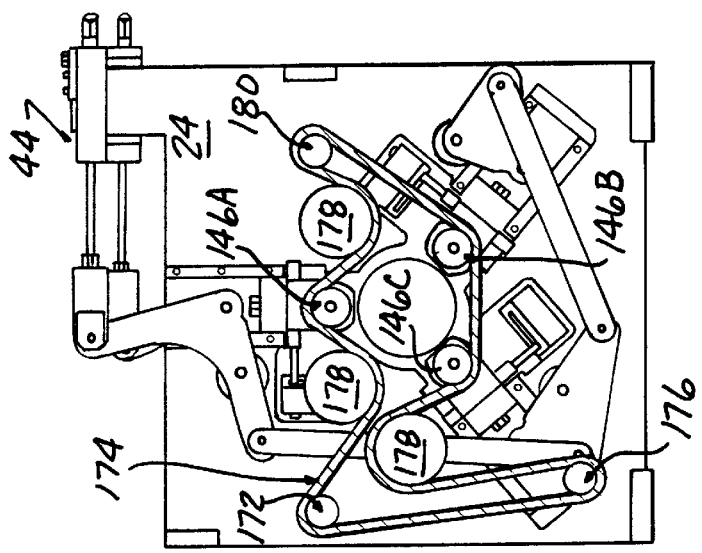
FIG. 13 is a reverse inside end view of the main plate showing the feed roller belt drive in a maximum trim diameter adjusted condition.
Figure 12:
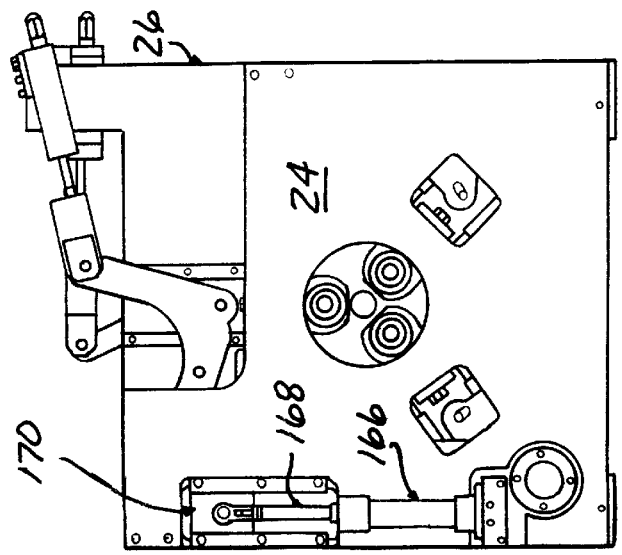
FIG. 12 is an outside end view of the end roller mounting main plate showing the belt tensions cylinder and slide for the feed roller drive assembly.

FIGS. 12–14 show the belt drive system which accommodates changes in the position of the roller pulleys 146A–146C while maintaining proper belt tension.

This system includes an air cylinder 166 mounted to the outside of end plate 24, the air cylinder 166 having an output rod 168 driving a tensioner slide 170. Tensioner slide 170 carrier a tensioner pulley 172 on the other side of plate 24 to move the same up and down in a manner to maintain tension of an endless drive belt 174 passing around the feed roll pulleys 46A, B and C a main drive pulley 176, and idler pulleys 178 and 180. A constant air pressure is supplied to air cylinder 166 which thus vary the positions of the tensioner pulley 172 as the roller pulleys 146A, B, C move in or out (FIGS. 13, 14) to maintain a constant tension of the belt 174. Belt 174 is preferably of a braided type to accommodate the slight tilting of the pulleys 146A, B, C with changes in feed rate settings.

The above described mechanisms allow initial set up adjustments to be made in a matter minutes rather hours, and can be made with the machine running without affecting the centerline of the roller array, to thus accomplish the objects of the invention by relatively simple parts.

What is claimed is:

1. A feed roller mechanism for a lip rolling machine including lip curling screws and an oven for preheating molded plastic containers preparatory to being received in said lip curling screws, and a feed roller mechanism for rotating and axially advancing a nested train of containers into said oven and lip curling screws, said feed roller mechanism including an arrangement of feed rollers each having an axis of rotation arranged about said stack of nested containers to engage the periphery of containers in said nested stack with the perimeter of said feed rollers which feed rollers are rotated to rotate said nested stack, said feed rollers each mounted for adjustable pivoting so as to be tilted at a slight angle to the direction of alignment of said train of nested containers so that engagement with said nested stack by rotating feed rollers cause axial advance of said container train in their direction of alignment at a rate corresponding to the degree of tilt of said feed rollers, the improvement comprising:

a mechanical interconnection between each of said feed rollers such that simultaneous tilting motion in unison is constrained, whereby a single adjustment can be made to variably tilt all of said feed rollers.

2. The feed roller mechanism according to claim 1 wherein said mechanical interconnection includes a linkage system operatively associated with each feed roller.

3. The feed roller mechanism according to claim 2 further including a series of angle adjust slides each drivingly connected to a respective one of said feed rollers to cause tilting thereof in response to advance or retraction of said slide, said linkage system driving all of said slides.

4. The feed roller mechanism according to claim 3 further including a single adjuster operating said linkage system and said slides.

5. The feed roller mechanism according to claim 4 wherein said linkage system includes a series of rotary arm elements each pivoted to a respective slide and caused to rotate in unison by operation of said adjuster.

6. The feed roller mechanism according to claim 5 wherein said linkage system includes links connecting at least some of said rotary arm elements to achieve said rotation in unison.

7. The feed roller mechanism according to claim 4 wherein each feed roller is mounted to a yoke, said yoke mounted to be rotatable to pivot said feed roller.

8. The feed roller mechanism according to claim 7 wherein each of said slides has a block mount block, said block carrying a self aligning bearing having a through opening therein, an elongated element fixed to said yoke and extending at a small inclination to travel of said slide, said elongated element having one end received in said opening, said element pivoting slightly as said associated slide travels in either direction to pivot said associated feed roller yoke and feed roller mounted thereto.

9. The feed roller mechanism according to claim 1 wherein each of said feed rollers is mounted for radial movement to increase or decrease the diameter of nested container stack engagable by said feed rollers, and further including an interconnection acting to constrain said radial movement of said feed rollers to occur in unison.

10. The feed roller mechanism according to claim 9 wherein each of said feed rollers is mounted on one of a series of diameter adjust slides mounted for movement in a radial direction.

11. The feed roller mechanism according to claim 10 wherein a linkage system interconnects said slides to cause all of said slides to move simultaneously.

12. The feed roller mechanism according to claim 11 further including separate adjusters operatively connected to said angle and diameter adjust slides respectively enabling separate angle and diameter adjustment of all of said feed rollers with a single adjustment.

* * * * *